E. E. NOVOTNY.
MOLDABLE COMPOSITE BODY.
APPLICATION FILED OCT. 30, 1920.

1,398,147. Patented Nov. 22, 1921.

Fibrous material. Phenol-furfural condensation product.

Inventor
Emil E. Novotny,
By his Attorneys
Meyers, Cavanagh & Hyde

UNITED STATES PATENT OFFICE.

EMIL E. NOVOTNY, OF LOGAN, PENNSYLVANIA, ASSIGNOR TO JOHN STOGDELL STOKES, OF PHILADELPHIA, PENNSYLVANIA.

MOLDABLE COMPOSITE BODY.

1,398,147.  Specification of Letters Patent.  Patented Nov. 22, 1921.

Application filed October 30, 1920. Serial No. 420,746.

*To all whom it may concern:*

Be it known that I, EMIL E. NOVOTNY, a citizen of the United States, and resident of Logan, in the county of Philadelphia and State of Pennsylvania, have invented certain new and useful Improvements in Moldable Composite Bodies, of which the following is a specification.

This invention relates to a moldable composite body adapted to be used for molding, pressing or otherwise fashioning printing plates, sound records and various other articles, and has particular application to a moldable composite body embracing a synthetic resin in the nature of a phenolic condensation product, and which is formed or made by using as one of the ingredients furfural, or if desired I may use the furfural derivative, furfuramid, as the equivalent or a substitute for the furfural as an ingredient.

While I have herein described my moldable body as made up in the form of sheets or boards, it will understood that it may be prepared in other shapes, such as blocks, cylinders and the like.

My invention consists in the moldable composite body and in the method of making the same set forth in and falling within the scope of the appended claims.

Figure 1:
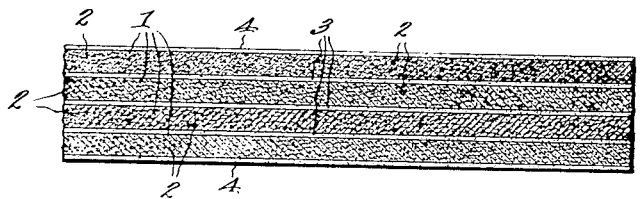

In the accompanying drawings, Figure 1 is a cross sectional view taken through a composite sheet embodying my invention, said sheet being illustrated as laminated or composed of a plurality of plies or layers.

Figure 2:
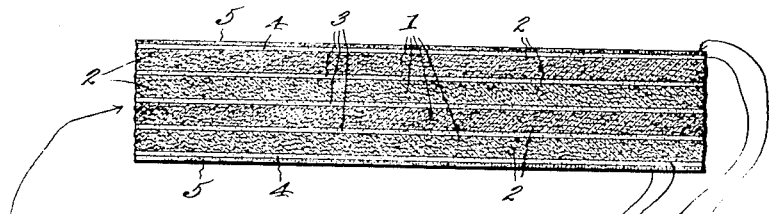

Fig. 2 is a cross sectional view taken through a modified form of composite sheet and wherein the face sections of said sheet are composed of a plurality of layers of the furfural-containing synthetic resin.

In Fig. 1 of the drawings I have shown one form of my invention wherein the composite sheet is formed of a plurality of united fibrous layers or sheets, faced on each side with a single layer or coating of said synthetic material. In the production of the composite sheet shown in Fig. 1, I select a suitable number of layers or plies of fibrous material shown at 1 and impregnate these with a synthetic resinous material as indicated at 2. The sheets are then imposed one upon another and cemented together by layers of suitable cement-like material shown at 3, and then each side of the laminated sheet thus formed is faced with a surface coating of synthetic resinous material as indicated at 4. Briefly, this is a description of the structure of my composite sheet. In the manufacture of this sheet I use a synthetic resin in the nature of a phenolic condensation product which is formed by intimately commingling phenol and furfural (furfuraldehyde) or as the equivalent thereof a furfural derivative such as furfuramid, treating the fusible gum thus formed with a suitable hardening agent, such as hexa-methylene-tetramin, or an additional amount of furfuramid, so that when subjected to the proper degree of heat, or to heat and pressure the fusible resin or gum formed by the mixture of phenol and furfural or a derivative of the latter, will assume a hard, set and infusible form. I have found that by making my composite sheet with a phenol-furfural synthetic resin, instead of a phenol-formaldehyde product, I obtain certain advantages. For example, this furfural phenolic condensation product re-acts with great speed, which is desirable for the attainment of economic molding conditions, and in its final infusible form, the molded article will present a deep jet-black, highly polished, smooth and attractive appearance without the use or addition of any dye, pigment or other coloring matter. The smooth, highly polished surface which results in molding an article from the present composite material is particularly desirable in the case of phonographic records, for the surface of the record made from this material is so hard, smooth and polished that the hissing or grinding sounds experienced with records now on the market is entirely eliminated, and full and clear overtones and undertones will be produced. In addition, my composite sheet prepared as herein set forth is readily separable from metal, after the molding operation, and the liability of the molded article sticking or clinging to the matrix is obviated. Furthermore, the present composite sheet under heat reaction, will set to a hard, tenacious and infusible form with such speed that it can be removed from the mold or matrix while still in a heated condition and without impairing the gloss, finish or shape of the molded article. I might also say that by avoiding the use of pigments, such as lamp black or the like, I obtain an article which will possess high dielectic strength.

One method which may be employed in making the composite sheet shown in Fig. 1 is as follows: I take the fibrous plies or layers 1, which are preferably composed of long fiber chip board, blotting paper, Yoshino paper, cloth or the like, and subject the same to a bath of the liquid synthetic resin. In preparing this liquid synthetic resin, I make a fusible gum preferably composed, by weight, of 100 parts of phenol, to 15 to 40 parts of furfural, treated with from 5 to 10 parts of a catalyst such as hydrochloric acid of about 39% strength. I dissolve this fusible gum in a suitable solvent, such as acetone or alcohol, preferably using three parts by weight of the solvent to the gum or resin. At the time of dissolving the fusible resin or gum in the solvent, I also add a suitable hardening agent, such as hexa-methylene-tetramin, using by weight 5 to 20% of the hexa-methylene-tetramin, in proportion to the weight of the fusible gum to be acted upon. I may also use as a hardening agent the furfural derivative, furfuramid, in any sitable proportion, say from 8 to 40% by weight of the mass or mixture being treated. I may also use furfural itself for the hardening agent, but when so doing, I add a suitable catalyst, such as ammonia. The use of such catalyst is not necessary where furfuramid is employed, as the latter itself liberates ammonia. After the sheets have been saturated in the bath, they are removed therefrom and preferably then first subjected to heat and pressure by being passed through a wringer and then to the action of heat, to drive off the solvent and eliminate moisture, and to partially harden and set the synthetic resin in the cells of the fiber. When the sheets have thus been dried and pressed, they possess a considerable degree of compressibility and have embodied therein but a relatively small percentage of the partially hardened and set synthetic resin. By thus making the sheets, I insure that in the molding operation there will be no oozing out or flow of excess phenolic material, for none exists, and furthermore, the compressibility of the fiber will enable the material to be pressed in the deepest as well as the shallowest depressions of the matrix. The amount of phenolic resin or gum incorporated in the sheets will preferably be from 10 to 20% of the resin or gum to 100% of the fiber mass. A number of these dried or impregnated fibrous sheets or layers are now cemented together by a suitable glue or adhesive, indicated at 3. This glue or adhesive may be either in the nature of a phenolic cement, containing furfural, or may be the ordinary vegetable or animal cement, and may be applied through the medium of a gluing machine or any desired manner. When a composite sheet or board of the desired thickness has been obtained, it is then subjected to pressure through the medium of a weighted block or any other suitable agency, until the sheets are firmly united.

The next step in the formation of the composite sheet consists in coating one or both its outer faces with the synthetic resinous coatings shown at 4. Although I may coat but one face of the sheet, I prefer to coat both faces to avoid warpage. In making the material for the coatings 4, I take one part of the synthetic resin or gum, which, as heretofore stated, is composed of phenol, furfural, treated with a catalytic agent, and embodying the hardening agent such as hexa-methylene-tetramin, and I mix this one part of resin or gum with four parts of barium sulfate and from one to two parts of alcohol, and grind this composition in a ball mill to thoroughly commingle the various ingredients and to reduce the same to a sluggish varnishlike mass. After these exterior coatings have been applied, the coated sheet is again subjected to heat, as in an oven, to drive off the alcohol and to dry the sheet, and partially harden and set the coatings to an almost infusible form. This heating action in addition to drying the coatings will further partially harden and set the resin, impregnating the various fiber layers. It is to be understood at this stage that the synthetic resin incorporated in the fiber sheets and applied as coatings thereto is not in its final infusible form, but is nearly so, or what might be termed "precooked", so that in the molding operation, while the composite sheet is capable of compression, and the surface layers are capable of taking impressions, the synthetic resin material will not flow or ooze from the sheet, and consequently will not stick to the mold or matrix. The sheet is now ready for use in molding various articles under heat and pressure, and either during or subsequent to the molding operation the synthetic material will assume its final hard, set and infusible form. It will present the deep, jet-black appearance with a highly polished smooth or glossy surface, and may be readily separated from the mold without marring or injurying.

In some instances it will be found desirable to apply a second or surface coating to each of the coatings 4, as shown at 5 in Fig. 2. Under such conditions the coatings 4 will constitute intermediate or barrier coatings which will not only prevent the penetration of the material of the coatings 5 into the laminated fibrous body, either during the formation of the sheet, or during the molding operation, but will also act as a sound repelling coating when used for sound records, in that such barrier coatings will prevent the absorption of the tones by the laminated fiber body and consequently eliminate the dulling or deadening of the under and over tones. In Fig. 2, these surface coatings 5 are also composed of the furfural-phenolic condensation varnish, but these coatings 5 are of a richer grade than the coatings 4. The coatings 5, for example, may be made of a mixture of one part of the furfural-phenol condensation product, heretofore described, mixed with one part of a filler, such as lampblack and two parts of alcohol, intimately commingled in a grinding mill. The filler may be omitted if desired, and the barium sulfate, which is incorporated in the coatings 4, as before mentioned, is also omitted, so that the outer coatings 5 will be more tenuous, but less brittle or softer than the coatings 4, as the effect of the barium sulfate in the coatings 4 is to render such coatings relatively hard and brittle. After the surface coatings 5 have been applied, the composite sheet is again heated and dried in an oven, or by other suitable agency, to partially harden such outer coatings, to eliminate moisture therefrom, and to render such coatings non-flowing while still possessing the capability of molding, as described for the coatings 4.

When the composite sheets are finished, they will appear as indicated by Figs. 1 and 2, and are ready for molding purposes. They may be shipped and stored for a long time without deterioration, as the synthetic resin of the sheets is in a non-flowing partially hardened and set condition as previously mentioned. The surfaces or coatings will present a smooth, skin-like appearance and will take impressions without gassing, bubbling or breaking, and without lateral or side flow or oozing of the material.

While I have herein shown and described a certain embodiment of my invention, I wish it to be understood that I do not limit myself to all the precise proportions or to the details of construction set forth by way of illustration, as modification and variation may be made without departing from the spirit of the invention or exceeding the scope of the appended claims. For example, the fiber body may be composed of a single sheet of fibrous material instead of being laminated, and the relative percentages of the furfural, phenol, hardening agent, catalyst and solvent may be varied to suit conditions of hardness and infusibility desired.

Furthermore, instead of combining furfural with the phenol in the formation of the fusible synthetic resin, I may make the fusible resin of phenol and formaldehyde in the proportions by weight of 100 parts of phenol to 55 parts of formaldehyde and the fusible resin thus formed may then be treated with furfural, or furfuramid as a hardening agent, used in the proportions of from 8 to 40% by weight of the weight of the fusible gum or resin being treated.

I may also first make a fusible resin by the action of an acetaldehyde or paraldehyde with phenol in the proportions by weight of 100 parts of phenol to 37 parts of the acetaldehyde or paraldehyde, treating the mass with a catalyst such as hydrochloric acid in the proportion of ¼ of 1% by weight of the catalyst to the weight of the mass being treated. The fusible gum thus formed may then be treated with furfural or its derivative, furfuramid, as the hardening agent, in the proportions by weight of from 15 to 40 parts furfural or furfuramid to the weight of the mass of fusible resin being treated. It will be noted, however, that in each instance, in the preparation of the synthetic resin, I resort to the use of furfural, or a derivative as the equivalent thereof, as an ingredient, and therefore where I have in the claims used the expression "furfural," I wish this to be understood as including its equivalents suitable for my purpose, such as furfuramid.

Furthermore, where I have here used the term "phenol," I wish this to be understood as including such analogous materials as cresol, resorcinol, naphthol and substances having similar characteristics.

What I claim is—

1. A moldable composite body comprising a sheet-like body of fibrous material treated with a synthetic resin comprising a condensation product formed from reacting ingredients including furfural.

2. A moldable composite body comprising a sheet-like body of porous material having a coating of moldable cementitious material comprising a condensation product formed from reacting ingredients including furfural.

3. A moldable composite body comprising a sheet-like body of porous material having on one face thereof a plurality of layers of synthetic resin comprising a condensation product formed from reacting ingredients including furfural.

4. A moldable composite body comprising a sheet-like fibrous body having applied thereto a coating of synthetic resin comprising a condensation product formed from reacting ingredients including furfural.

5. A moldable composite body comprising a sheet-like body of fibrous material having incorporated therewith a synthetic resin comprising a condensation product formed from reacting ingredients including furfural.

6. A moldable composite body comprising a sheet-like body of porous, fibrous material coated with and having incorporated therein a synthetic resinous material comprising condensation product formed from reacting ingredients, including furfural.

7. A moldable composite body comprising a sheet-like body of fibrous material impregnated with and having a surface coating of a partially reacted synthetic resinous material, comprising a condensation product formed from reacting ingredients, including furfural.

8. A moldable composite body comprising a sheet-like fibrous body treated with a synthetic resin, comprising a condensation product formed by the combination and reaction of phenol and furfural and a hardening agent.

9. A moldable composite body comprising a sheet-like fibrous body treated with a synthetic resin comprising a condensation product formed by the combination and reaction of phenol and furfural, and a methylene containing agent.

10. A moldable composite body comprising a sheet-like fibrous material treated with a synthetic resin comprising a condensation product formed by the combination of phenol and furfural and hexa-methylene-tetramin.

11. A moldable composite body comprising a fibrous sheet impregnated with a fusible synthetic resin comprising a condensation product formed by the combination and reaction of phenol and furfural and a hardening agent, and provided with a moldable impression-taking surface of synthetic resin.

12. A moldable composition comprising a fibrous sheet having incorporated therewith a potentially reactive fusible synthetic resin comprising a condensation product formed by the combination and partial reaction of phenol and furfural and a hardening agent.

Signed at Philadelphia in the county of Philadelphia and State of Pennsylvania this 28th day of October A. D. 1920.

EMIL E. NOVOTNY.